(12) United States Patent
Leach et al.

(10) Patent No.: US 12,278,026 B2
(45) Date of Patent: Apr. 15, 2025

(54) MAGNET WIRE WITH THERMOPLASTIC INSULATION

(71) Applicant: Essex Furukawa Magnet Wire USA LLC, Atlanta, GA (US)

(72) Inventors: Matthew E. Leach, Fort Wayne, IN (US); Mohammad Mazhar Said, South Barrington, IL (US); Guadalupe Arambula, Fort Wayne, IN (US); Zhiyang Zhao, Fort Wayne, IN (US)

(73) Assignee: ESSEX SOLUTIONS USA LLC, Atlanta, GA (US)

( * ) Notice: Subject to any disclaimer, the term of this patent is extended or adjusted under 35 U.S.C. 154(b) by 59 days.

(21) Appl. No.: 18/197,199

(22) Filed: May 15, 2023

(65) Prior Publication Data

US 2023/0290539 A1    Sep. 14, 2023

Related U.S. Application Data

(63) Continuation of application No. 17/396,173, filed on Aug. 6, 2021, now Pat. No. 11,688,527.

(60) Provisional application No. 63/062,501, filed on Aug. 7, 2020.

(51) Int. Cl.
*H01B 13/14*     (2006.01)
*H01B 7/02*      (2006.01)
*H01B 13/06*     (2006.01)
*H01B 3/42*      (2006.01)

(52) U.S. Cl.
CPC ......... *H01B 7/0275* (2013.01); *H01B 13/065* (2013.01); *H01B 13/141* (2013.01); *H01B 13/148* (2013.01); *H01B 3/421* (2013.01); *H01B 3/427* (2013.01)

(58) Field of Classification Search
CPC .. H01B 7/0275; H01B 13/065; H01B 13/141; H01B 13/148; H01B 3/421; H01B 3/427
See application file for complete search history.

(56) References Cited

U.S. PATENT DOCUMENTS

| 6,403,889 B1 | 6/2002 | Mehen |
| 10,991,483 B2 | 4/2021 | Ikeda |
| 2008/0128154 A1 | 6/2008 | Faust et al. |

(Continued)

FOREIGN PATENT DOCUMENTS

| EP | 2843668 A1 | 3/2015 |
| EP | 2943962 A1 | 11/2015 |

(Continued)

OTHER PUBLICATIONS

Chinese Office Action in Application No. 2021800655482.

(Continued)

*Primary Examiner* — Nathan H Empie

(57) ABSTRACT

A method for forming magnet wire includes co-extruding multiple layers of different insulating materials. A conductor may be provided, and extruded insulation may be formed around the conductor by co-extruding both a first layer of thermoplastic insulation and a second layer of thermoplastic insulation with the second layer formed around the first layer. The first layer may include a first polymeric material having a first thermal index, and the second layer may include a second polymeric material having a second thermal index higher than the first thermal index.

17 Claims, 4 Drawing Sheets

(56) References Cited

U.S. PATENT DOCUMENTS

| | | |
|---|---|---|
| 2011/0226508 A1 | 9/2011 | Aoi et al. |
| 2015/0310959 A1 | 10/2015 | Oya |
| 2016/0189826 A1 | 6/2016 | Fukuda et al. |
| 2016/0196912 A1 | 7/2016 | Sanner |
| 2016/0307662 A1 | 10/2016 | Ikeda et al. |
| 2016/0307668 A1* | 10/2016 | Oya .................. H01B 13/141 |
| 2018/0268962 A1* | 9/2018 | Ikeda ................ H01B 7/0225 |
| 2020/0251243 A1 | 8/2020 | Knerr |
| 2020/0312535 A1 | 10/2020 | Said et al. |

FOREIGN PATENT DOCUMENTS

| | | |
|---|---|---|
| EP | 3043356 A1 | 7/2016 |
| WO | 2014183011 A2 | 11/2014 |

OTHER PUBLICATIONS

International Search Report mailed Nov. 9, 2021 for Application No. PCT/US2021/44987.
European search report in Application No. 21854112.6. Issued Jul. 25, 2024.

\* cited by examiner

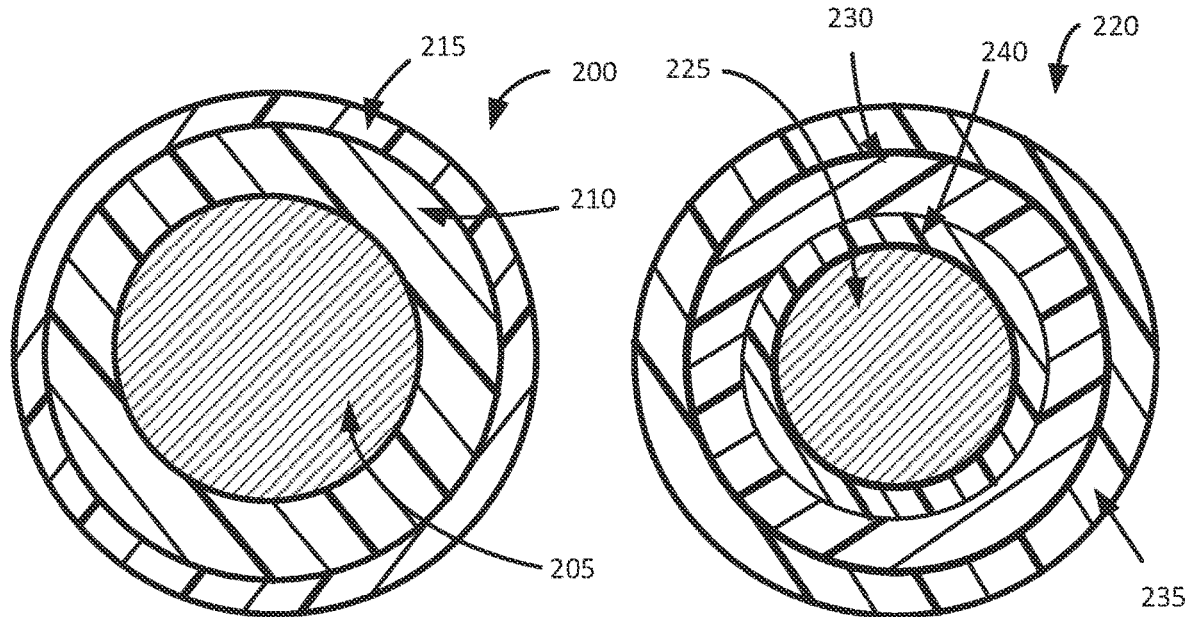
FIG. 2A
FIG. 2B
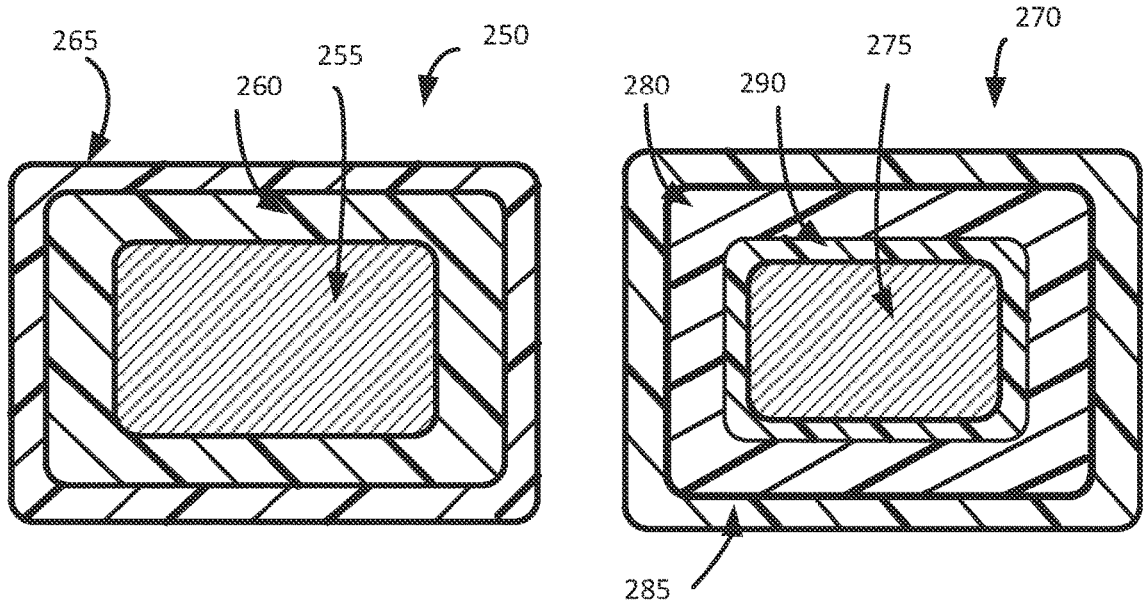
FIG. 2C
FIG. 2D

MAGNET WIRE WITH THERMOPLASTIC INSULATION

CROSS-REFERENCE TO RELATED APPLICATION

This application is a continuation of co-pending U.S. patent application Ser. No. 17,396,173, filed Aug. 6, 2021 and entitled "Magnet Wire with Thermoplastic Insulation", which claims priority to U.S. Provisional Application No. 63/062,501, filed Aug. 7, 2020 and entitled "Magnet Wire with Thermoplastic Insulation". The contents of each of these prior applications is incorporated by reference herein in its entirety.

TECHNICAL FIELD

Embodiments of the disclosure relate generally to magnet wire and, more particularly, to magnet wire that includes extruded insulation formed from multiple layers of different materials.

BACKGROUND

Magnet wire, also referred to as winding wire or magnetic winding wire, is utilized in a wide variety of electric machines and devices, such as inverter drive motors, motor starter generators, transformers, etc. Typically, magnet wire is constructed by applying electrical insulation to a metallic conductor, such as a copper, aluminum, or alloy conductor. The insulation provides for electrical integrity and prevents shorts in the magnet wire. Conventional insulation often consists of polymeric enamel films that are applied in successive layers and cured in an oven. Enamel layers are typically applied as a varnish containing thermoset polymeric material suspended in solvent, and the heat curing removes the solvent. In order to achieve higher dielectric strengths and partial discharge performance to satisfy increasing electrical performance criteria, it is typically necessary to apply a greater number of layers and, therefore, thicken the enamel. However, each successive pass through the baking furnace lowers the adhesive force between the enamel and the conductor, and it is difficult to build the enamel thickness beyond a certain point. Additionally, increased enamel layering may lead to solvent blisters or beading and/or reduced flexibility. Further, the process for applying enamel insulation is energy intensive and inefficient, and the solvents utilized are typically hazardous materials that must be handled appropriately.

Recently, attempts have been made to form magnet wire insulation from extruded thermoplastic materials. The thermoplastic insulation is either extruded over a bare conductor or a conductor having base enamel insulation. For example, a relatively thick layer of a high-performance material, such as polyetheretherketone ("PEEK"), can be extruded over a conductor. As another example, U.S. Pat. No. 9,224,523 describes a magnet wire in which PEEK is extruded over an enamel layer. Similarly, U.S. Pat. No. 9,324,476 describes a magnet wire in which either PEEK or polyaryletherketone ("PAEK") is extruded over an enamel layer. The use of certain high performance thermoplastic materials can form insulation having similar performance to certain enamel materials. For example, PEEK may have similar performance to thermoset polyimide.

However, relatively high-performance thermoplastic materials are expensive and increase the cost of the magnet wire relative to conventional insulation that utilizes all enamel. For example, thermoplastic PEEK may have a cost that is two to four times greater than thermoset polyimide. Accordingly, there is an opportunity for improved insulated magnet wire, and more particularly, improved magnet wire that includes thermoplastic insulation formed from a plurality of layers of different materials. In particular, there is an opportunity for improved magnet wire that includes a base layer of a lower cost or lower performance first polymeric material and a second layer of a higher performance second polymeric material.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

FIGS. 2A-2D are cross-sectional views of example magnet wire constructions that include extruded insulation formed from multiple layers of different materials, according to illustrative embodiments of the disclosure.

DETAILED DESCRIPTION

Figure 1:
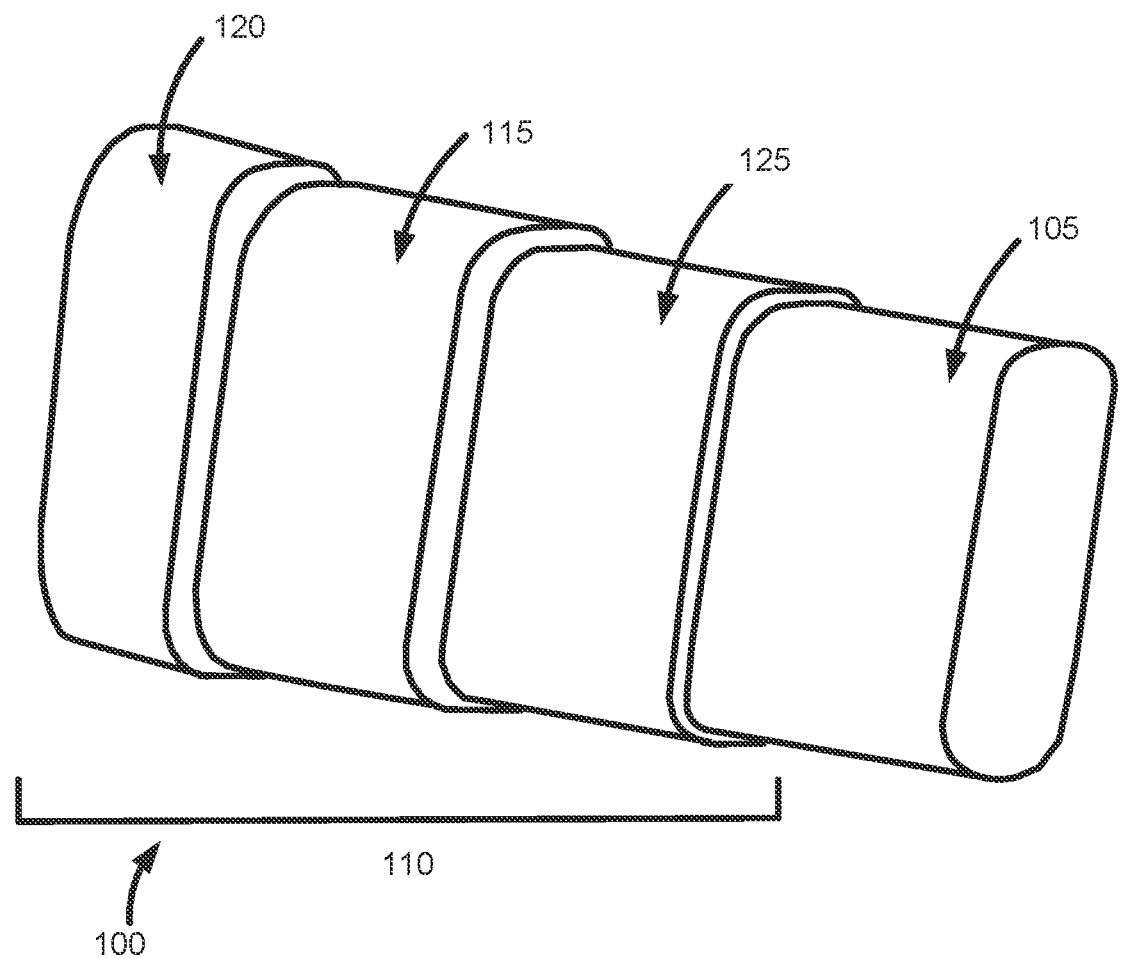
FIG. 1 is a perspective view of an example magnet wire that includes extruded insulation formed from multiple layers of different materials, according to an illustrative embodiment of the disclosure.

Various embodiments of the present disclosure are directed to magnet wire that includes a conductor and insulation formed around the conductor with a plurality of layers formed from different extruded polymeric materials. The insulation may include at least a first layer of extruded thermoplastic insulation formed around the conductor and a second layer of extruded thermoplastic insulation formed around the first layer. The first layer may be formed from a first polymeric material having a first thermal class, a first thermal index, and/or a first melt temperature, and the second layer may be formed from a second polymeric material different than the first polymeric material and having a second thermal class higher than the first thermal class, a second thermal index higher than the first thermal index, and/or a second melt temperature higher than the first melt temperature. In certain embodiments, the first layer of thermoplastic insulation may be formed directly around the conductor. In other embodiments, one or more base insulation layers may be formed around a conductor, and the first layer of thermoplastic insulation may be formed around the base insulation layer(s). For example, one or more layers of polymeric enamel insulation may be formed around a conductor, and first layer of thermoplastic insulation may be formed around the enamel.

Other embodiments of the disclosure are directed to methods of forming magnet wire that includes a conductor and insulation formed around the conductor that includes a plurality of different layers of extruded thermoplastic materials. A conductor may be provided and insulation may be formed around the conductor. Forming insulation may include forming a first layer of thermoplastic insulation around the conductor and a second layer of thermoplastic insulation around the first layer. Forming the first layer may include extruding a first polymeric material having a first thermal class, a first thermal index, and/or a first melt temperature. Forming the second layer may include extruding a second polymeric material different from the first polymeric material and having a second thermal class higher than the first thermal class, a second thermal index higher than the first thermal index, and/or a second melt temperature higher than the first melt temperature.

A wide variety of different polymeric materials may be utilized as desired in various embodiments of the disclosure in order to form extruded thermoplastic insulation layers. For example, a lower performance and/or less expensive material may be utilized to form the first layer and a higher performance material may be utilized to form the second layer. In certain embodiments, the first polymeric material may include at least one of polyester, copolyester, nylon, polyphenylene sulfide ("PPSU"), polyphenylsulfone ("PPS"), polyethersulfone ("PESU"), crosslinked polyethylene, polycarbonate, polystyrene, an acrylic, a fluoropolymer, and/or another suitable polyolefin material. As desired, the first polymeric material may be formed from a blend or mixture of a plurality of polymeric materials. In certain embodiments, the second polymeric material may include at least one of polyetheretherketone ("PEEK"), polyaryletherketone ("PAEK"), or polyetherketoneketone ("PEKK"). As desired, the second polymeric material may be formed from a blend or mixture of a plurality of polymeric materials.

As desired, first and second polymeric materials may be selected based on a wide variety of suitable properties and/or cost considerations. In certain embodiments, the first polymeric material may have a thermal class or a thermal index of 200° C. or less and the second polymeric material may have a thermal class or a thermal index of 220° C., 240° C., or more. As desired in various embodiments, one or more additives may be incorporated into an extruded insulation layer, such compatabilizers (e.g., compatabilizers utilized in a polymeric blend, etc.), filler materials, adhesion promotors, etc.

First and second layers of extruded thermoplastic insulation may also be formed with a wide variety of suitable thicknesses and ratios of thicknesses. In certain embodiments, the first layer may constitute at least fifty-five percent (55%), sixty percent (60%), or another suitable percentage of a thickness of the extruded insulation (e.g., a combined thickness of the first and second layers, etc.). For example, the first layer may constitute between fifty-five percent (55%) and eighty percent (80%) of a thickness of the extruded insulation and the second layer may constitute between twenty percent (20%) and forty-five percent (45%) of the thickness of the extruded insulation. Other thickness percentages and/or ratios of thicknesses may be utilized as desired in various embodiments. Further, the overall extruded thermoplastic insulation (e.g., the combined first and second layers, etc.) may be formed with a wide variety of suitable thicknesses. In certain embodiments, the extruded thermoplastic insulation may have a thickness between approximately 15 micrometers and approximately 200 micrometers, such as a thickness between 100 micrometers and 200 micrometers. Additionally, individual layers of the extruded thermoplastic insulation, such as the first and second layers, may be formed with any suitable respective thicknesses.

As a result of forming extruded insulation with a plurality of layers that include different materials, the cost of a magnet wire may be reduced relative to conventional magnet wires that utilize high performance thermoplastic polymers, such as PEEK. For example, multi-layer insulation may include a first layer formed from a less expensive material and a second layer formed from a high-performance material, and the overall cost of the two layers may be lower than a single layer of the high-performance material. The multi-layer insulation may also provide similar or improved performance (e.g., PDIV, dielectric breakdown, temperature rating, etc.) relative to single layer insulation formed from a high-performance material (e.g., PEEK).

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a perspective view of an example magnet wire 100 that includes extruded insulation is illustrated in accordance with an embodiment of the disclosure. The magnet wire 100 may include a central conductor 105 and insulation 110 formed around the conductor 105. The insulation 110 may include at least two layers of extruded insulation. As shown, the insulation 110 may include a first layer 115 of extruded insulation formed around the conductor 105 and a second layer 120 of extruded insulation formed around the first layer 115. According to an aspect of the disclosure, the first layer 115 and the second layer 120 may be formed from different polymeric materials (e.g., different single materials, different groups or blends of materials, etc.). Additionally, in certain embodiments, the first layer 115 may be formed directly on the conductor 105. In other embodiments, optional base insulation 125 may be formed around the conductor 105, and the first layer 115 may be formed on the base insulation 125. As desired, the base insulation 125 may include any number of sublayers.

FIGS. 2A-2D are cross-sectional views of example magnet wire constructions 200, 220, 250, 270 that include a plurality of different layers of extruded insulation, according to illustrative embodiments of the disclosure. FIG. 2A illustrates an example magnet wire 200 having a round or circular cross-sectional shape in which multiple layers of extruded insulation are formed around a conductor 205. For example, a first layer 210 and a second layer 215 of extruded insulation may be formed around the conductor 205. FIG. 2B illustrates another example magnet wire 220 having a round cross-sectional shape. The magnet wire 220 may include a conductor 225 and first and second layers 230, 235 of extruded insulation formed around the conductor 225. However, the magnet wire 220 of FIG. 2B also includes base insulation 240 formed around the conductor 225 with the first layer 230 of extruded insulation formed around the base insulation 240. FIG. 2C illustrates an example magnet wire 250 having a rectangular cross-sectional shape in which multiple layers of extruded insulation are formed around a conductor 255. For example, a first layer 260 and a second layer 265 of extruded insulation may be formed around the conductor 255. FIG. 2D illustrates another example magnet wire 270 having a rectangular cross-sectional shape. Similar to the magnet wires 100 of FIGS. 1 and 2B, the magnet wire 270 of FIG. 2D includes a conductor 275, base insulation 290 formed around the conductor 275, and first and second layers 280, 285 of extruded insulation formed around the base insulation 290.

Each of the layers or components of the magnet wire 100 of FIG. 1 will now be described in greater detail. The example magnet wires 200, 220, 250, 270 of FIGS. 2A-2D may include layers or components similar to those described with reference to FIG. 1. Indeed, as desired in various embodiments, a magnet wire may be formed with a wide variety of suitable cross-sectional shapes and insulation configurations provided that the insulation includes a plurality of extruded insulation layer formed from different polymeric materials. The example constructions illustrated in FIGS. 1-2D are provided by way of non-limiting example only.

Turning first to the conductor 105, the conductor 105 may be formed from a wide variety of suitable materials and/or combinations of materials. For example, the conductor 105 may be formed from copper, aluminum, annealed copper, oxygen-free copper, silver-plated copper, nickel plated copper, copper clad aluminum ("CCA"), silver, gold, a conductive alloy, a bimetal, carbon nanotubes, or any other suitable electrically conductive material. Additionally, the conductor 105 may be formed with any suitable dimensions and/or cross-sectional shapes. As shown, the conductor 105 may have a rectangular cross-sectional shape. In other embodiments, such as those illustrated in FIGS. 2A and 2B, a conductor 105 may have a circular or round cross-sectional shape. In yet other embodiments, a conductor may be formed with a square shape, an elliptical or oval shape, or any other suitable cross-sectional shape. Additionally, as desired for certain cross-sectional shapes such as the illustrated rectangular shape, a conductor may have corners that are rounded, sharp, smoothed, curved, angled, truncated, or otherwise formed.

The conductor 105 may also be formed with any suitable dimensions, such as any suitable gauge, diameter, height, width, cross-sectional area, etc. As one non-limiting example, the longer sides of a rectangular conductor 105 may be between approximately 0.020 inches (508 µm) and approximately 0.750 inches (19050 µm), and the shorter sides may be between approximately 0.020 inches (508 µm) and approximately 0.400 inches (10160 µm). An example square conductor may have sides between approximately 0.020 inches (508 µm) and approximately 0.500 inches (12700 µm). An example round conductor may have a diameter between approximately 0.010 inches (254 µm) and approximately 0.500 inches (12700 µm). Other suitable dimensions may be utilized as desired.

A wide variety of suitable methods and/or techniques may be utilized to form, produce, or otherwise provide a conductor 105. In certain embodiments, a conductor 105 may be formed by drawing input material (e.g., a larger conductor, rod stock, etc.) through one or more dies in order to reduce the size of the input material to desired dimensions. As desired, one or more flatteners and/or rollers may be used to modify the cross-sectional shape of the input material before and/or after drawing the input material through any of the dies. In certain embodiments, the conductor 105 may be formed in tandem with the application of a portion or all of the insulation system. In other words, conductor formation and application of insulation material may be conducted in tandem. In certain embodiments, a conductor 105 with desired dimensions may be preformed or obtained from an external source, and insulation material may then be applied via a subsequent process.

In certain embodiments, base insulation 125 may be formed on the conductor 105 prior to application of first and second layers 115, 120 of extruded insulation. A wide variety of suitable materials may be utilized as desired to form base insulation 125. For example, the base insulation 125 may include one or more layers of polymeric enamel, one or more semi-conductive layers, and/or one or more tape or wrap layers. In certain embodiments, the base insulation 125 may be formed directly on the conductor 105, for example, around an outer periphery of the conductor 105. Additionally, as desired, the base insulation 125 may include a single layer of insulation material or a plurality of sublayers of insulation material (e.g., a plurality of enamel layers, etc.).

In the event that the base insulation 125 is formed with a plurality of sublayers, any number of sublayers may be utilized. In certain embodiments, the sublayers may be formed from the same substance or material (e.g., a plurality of enamel layers formed from the same polymeric material, etc.). In other embodiments, at least two of the sublayers may be formed from different materials. For example, different enamel layers may be formed from different polymeric materials. As another example, one or more sublayers may be formed from enamel while another sublayer is formed from a suitable tape or wrap.

As set forth above, the base insulation 125 may include one or more layers of enamel. An enamel layer is typically formed by applying a polymeric varnish to the conductor 105 and then baking the conductor 105 in a suitable enameling oven or furnace. The polymeric varnish typically includes thermoset polymeric solid material suspended in one or more solvents. Following application of the varnish, solvent is removed as a result of baking or curing, thereby leaving a solid polymeric enamel layer. As desired, multiple layers of enamel may be applied to the conductor 105. For example, a first layer of enamel may be applied, and the conductor 105 may be passed through an enameling oven or other suitable curing device. A second layer of enamel may then be applied, and the conductor 105 may make another pass through the curing device (or a separate curing device). This process may be repeated until a desired number of enamel coats have been applied and/or until a desired enamel thickness or build has been achieved. As desired, an enameling oven may be configured to facilitate a wire 100 making multiple passes through the oven. Other curing devices that may be utilized in addition to or as an alternative to enameling ovens include, but are not limited to, infrared light systems, ultraviolet light systems, and/or electron beam systems.

Any number of enamel layers may be formed in various embodiments. Additionally, each layer of enamel and/or a total enamel build may have any desired thickness, such as a thickness of approximately 0.0002, 0.0005, 0.007, 0.001, 0.002, 0.003, 0.004, 0.005, 0.006, 0.007, 0.008, 0.009, 0.010, 0.012, 0.015, 0.017, or 0.020 inches, a thickness included in a range between any two of the aforementioned values, or a thickness included in a range bounded on either a minimum or maximum end by one of the aforementioned values. A wide variety of different types of polymeric materials may be utilized as desired to form an enamel layer. Examples of suitable materials include, but are not limited to, polyimide, polyamideimide, amideimide, polyester, polyesterimide, polysulfone, polyphenylenesulfone, polysulfide, polyphenylenesulfide, polyetherimide, polyamide, polyketones, etc. In certain embodiments, the base insulation 125 may include polyimide ("PI") enamel, polyamide-imide ("PAI") enamel, or a combination thereof. As desired, one or more suitable filler materials may be incorporated into an enamel layer. Examples of suitable filler materials include, but are not limited to, inorganic materials (e.g., metals, etc.), organic materials, and/or other materials, such as any of the filler materials described below with reference to the extruded insulation layers. In certain embodiments, the filler material(s) may enhance corona resistance and/or one or more thermal properties (e.g., temperature resistance, cut-through resistance, heat shock, etc.) of an enamel layer. The particles of a filler material may have any suitable dimensions, such as any suitable diameters. Further, any suitable blend or mixture ratio between filler material and the polymeric material of an enamel layer may be utilized.

As desired, other types of base insulation 125 may be utilized in addition to or as an alternative to enamel. In certain embodiments, the base insulation 125 may include one or more suitable wraps or tapes, such as a polymeric tape wrapped around the conductor 105 and/or any underlying layers. In other embodiments, the base insulation 125 may include one or more semi-conductive layers of material. A semi-conductive layer may have a conductivity between that of a conductor 105 and that of an insulator, and the use of one or more semi-conductive layers may assist in equalizing or "smoothing out" non-uniform electric, magnetic, and/or electromagnetic fields that may stress the magnet wire insulation.

With continued reference to FIG. 1, the insulation 100 may include a plurality of layers of extruded insulation formed around the conductor 105. According to an aspect of the disclosure, at least a first layer 115 of extruded insulation may be formed around the conductor 105, and a second layer 120 of extruded insulation may be formed around the first layer 115. Additionally, the first and second layers 115, 120 may be formed from different thermoplastic polymeric materials. For example, the first layer 115 may be formed with a lower performance and/or lower cost material than the second layer 120. In certain embodiments, such as the embodiments illustrated in FIGS. 2A and 2D, the first layer 115 of extruded insulation may be formed directly around the conductor 105 without any intervening insulation layers. In other embodiments, such as the embodiments illustrated in FIGS. 1, 2B and 2D, the first layer 115 of extruded insulation may be formed over base insulation 125 (e.g., polymeric enamel, etc.).

A wide variety of suitable materials and/or combinations of materials may be utilized to form extruded insulation, such as the first layer 115 and the second layer 120. Examples of suitable materials include, but are not limited to, polyetheretherketone ("PEEK"), polyetherketoneketone ("PEKK"), polyetheretherketoneketone ("PEEKK"), polyetherketone ("PEK"), polyaryletherketone ("PAEK"), other suitable polymers that include at least one ketone group, polyetherimide ("PEI") such as Ultem® marketed by Sabic Global Technologies, polyphenylsulfone ("PPSU") such as Radel® marketed by Solvay Specialty Polymers USA, polyethersulfone ("PESU"), polyphenylene sulfide ("PPS"), polybenzimidazole ("PBI"), polycarbonate, one or more polyesters (e.g., polyethylene terephthalate ("PET"), etc.), one or more copolyesters, nylon, thermoplastic polyamide, thermoplastic polyimide ("TPI"), one or more acrylic materials, one or more fluoropolymers, polystyrene, and/or various copolymers of multiple materials.

In certain embodiments, a first layer 115 may be formed from a lower performance and/or less expensive material, and a second layer 120 may be formed from a higher performance material. In certain example embodiments, the first layer 115 may me formed from a first thermoplastic polymeric material that includes at least one of polyester, copolyester, nylon, polycarbonate, acrylic, a fluoropolymer, polyphenylene sulfide ("PPSU"), polyethersulfone ("PESU"), polyetherimide ("PEI"), or polyphenylsulfone ("PPS"). The second layer 120 may be formed from a second thermoplastic polymeric material that includes at least one of polyetheretherketone ("PEEK"), polyaryletherketone ("PAEK"), or polyetherketoneketone ("PEKK"). In certain embodiments, one of the first layer 115 or the second layer 120 may be formed from a blend or mixture of a plurality of polymeric materials. For example, the first layer 115 may be formed from a polymeric blend that includes at least one of the example materials listed above as suitable for the first layer 115. As another example, the second layer 120 may be formed from a polymeric blend that includes at least one of the materials listed above as suitable for the second layer 120 (e.g., a blend including PEEK, etc.). Additionally, in certain embodiments, the polymeric material(s) utilized to form the first layer 115 may be immiscible with the polymeric material(s) utilized to form the second layer 120.

In one example embodiment, a first layer 115 may be formed from PEI and a second layer 120 may be formed from PEEK. In another example embodiment, a first layer 115 may be formed from PEI and a second layer may be formed from PAEK. In another example embodiment, a first layer may be formed from PEI and a second layer may be formed from PEKK. In other example embodiments, a first layer may be formed from PPSU and a second layer may be formed from PEEK, PAEK, or PEKK. In other example embodiments, a first layer may be formed from PESU and a second layer may be formed from PEEK, PAEK, or PEKK. In yet other example embodiments, a first layer may be formed from PSU and a second layer may be formed from PEEK, PAK, or PEKK. Other layer combinations may be utilized as desired.

Although example extruded insulation is described herein as having a first layer 115 and a second layer 120, extruded insulation may be formed with any number of suitable layers. For example, in other embodiments, three or more layers of extruded material may be co-extruded or otherwise incorporated into an insulation system. For example, a combination of PPSU, PEI, and PEEK may be co-extruded as triple layer insulation. Other suitable combinations of materials, including any of the materials discussed herein, can alternatively be utilized to form three or more co-extruded insulation layers.

In the event that an extruded layer (e.g., the first layer 115, the second layer 120, etc.) is formed from a polymeric material that is a blend, two or more component polymeric materials may be blended or mixed together at any suitable blend rates or ratios within the blend. For example, each component material may constitute between approximately 1.0% and approximately 99% by weight of a polymeric blend. In certain embodiments, each component material incorporated into a blend (e.g., a first component material, a second component material, etc.) may constitute approximately 5, 10, 15, 20, 25, 30, 40, 45, 50, 60, 70, 75, 80, 90, or 95% by weight of the blend, a weight percentage included in a range between any two of the above values (e.g., between approximately 5 and 95%, between approximately 10 and 90%, etc.), or a weight percentage included in a range bounded on either a minimum or maximum end by one of the above values (e.g., at least 5%, at least 10%, no more than 95%, no more than 90%, etc.). Component materials and relative amounts of materials incorporated into a blend may be selected based on a wide variety of suitable factors including, but not limited to, costs of the materials, processing characteristics, desired dielectric breakdown, desired partial discharge inception voltage ("PDIV"), desired cut through, desired thermal aging properties, desired temperature rating, desired crystallinity, etc.

As desired, first and second polymeric materials respectively utilized to form the first layer 115 and the second layer 120 may be selected based on a wide variety of suitable properties and/or cost considerations. For example, the first polymeric material may have a first melt point (or melting point) that is lower than a second melt point of the second polymeric material. In certain embodiments, the first polymeric material may have a melt point that is lower than 300° C., 250° C., 200° C., 180° C., or another suitable value. The second polymeric material may then have a melt point that is higher than that of the first polymeric material. Similarly, in certain embodiments, the first polymeric material may have a first glass transition temperature that is lower than a second glass transition temperature of the second polymeric material. In certain embodiments, the first polymeric material may have a glass transition temperature that is lower than 300° C., 250° C., 200° C., 180° C., or another suitable value. The second polymeric material may then have a glass transition temperature that is higher than that of the first polymeric material.

In various embodiments, the first and second polymeric materials may be selected to have different thermal classifications (or thermal classes), thermal indexes, or thermal endurances. In other words, the first polymeric material may have a first thermal class, thermal index, or thermal endurance that is lower than a second thermal class, thermal index, or thermal endurance of the second polymeric material. Thermal classes, which are generally established by industry standards organizations (e.g., the National Electric Manufacturers Association, the International Electrotechnical Commission, UL, etc.), establish maximum allowable temperatures for an insulation material and/or magnet wire. Example thermal classes include, for example, 180° C., 200° C., 220° C., 240° C., and 250° C. A thermal index is generally defined as a number in degrees Celsius that compares the temperature vs. time characteristics of an electrical insulation material. It may be obtained by extrapolating the Arrhenius plot of life versus temperature to a specified time, usually 20,000 hours. As an example of the difference between a thermal class and a thermal index, a material may have a thermal index of 230° C.; however, that material will have a thermal class of 220° C. as it does not meet the requirements of the next available thermal class of 240° C. In certain embodiments, the first polymeric material may have a thermal class of 200° C. or less and the second polymeric material may have a thermal class of 220° C. or more. In other embodiments, the first polymeric material may have a thermal class of 200° C. or less and the second polymeric material may have a thermal class of 240° C. or more. In one example embodiment, a first polymeric material may be a PPSU material having a thermal class of 200° C., and a second polymeric material may be a PEEK material having a thermal class of 240° C. or more. In other embodiments, the first and second polymeric materials may be selected to have different thermal indexes. In other words, the first polymeric material may have a first thermal index that is lower than a second thermal index of the second polymeric material. For example, the first polymeric material may have a thermal index of 200° C. or less, and the second polymeric material may have a thermal index greater than or equal to 220° C., 225° C., 230° C., 235° C., 240° C., 245° C., 250° C., 255° C., 260° C., or a thermal index included in a range between any two of the above values.

Additionally, in certain embodiments, the first and second polymeric materials may be selected to have different physical properties. For example, the first polymeric material may include an amorphous material and the second polymeric material may include a semi-crystalline or a crystalline material. Thermoplastic materials with a semi-crystalline structure may provide desirable mechanical properties and/or desirable chemical resistance due to the unique crystal structure inside the material. However, a semi-crystalline material typically exhibits a higher thermal expansion and shrinkage ratio during processing. For instance, PEEK has an average mold shrinkage between approximately 1.1 and 1.5. This shrinkage is higher than amorphous materials, such as PPSU which has a mold shrinkage ratio of approximately 0.7. The higher mold shrinkage ratio of semi-crystalline materials may generate greater residual stress during the wire extrusion process, which may lead to relatively low adhesion properties. This problem is exacerbated for thicker build extruded magnet wires. Using multiple layers of extruded material in accordance with embodiments of the present disclosure can improve the adhesion properties of the extruded insulation while still allowing the extruded insulation (e.g., an outer layer of semi-crystalline material, etc.) to provide desired mechanical properties, desired chemical resistance, and/or desired thermal properties. Additionally, if the materials utilized to form multiple layers of extruded insulation have similar volume resistances and dielectric constants, the dielectric properties and electrical performance of the multi-layer insulation may be similar or better than that of extruded insulation formed from a single material (e.g., PEEK, etc.).

As desired in various embodiments, one or more additives may be incorporated into an extruded insulation layer, such as the first layer 115 and/or the second layer 120. For example, in certain embodiments, one or more compatabilizers may be added to a polymeric material or a polymeric blend in order to increase the stability of the material or polymeric blend. As another example, one or more fluoropolymers, such as polytetrafluoroethylene ("PTFE") may be blended, mixed, added, or otherwise incorporated into an extruded insulation layer. As yet another example, one or more suitable filler materials may be added to a polymeric material utilized to form an extruded insulation layer. Examples of suitable filler materials include, but are not limited to, inorganic materials such as metals, transition metals, lanthanides, actinides, carbon nanotubes, boron nitride, metal oxides, and/or hydrated oxides of suitable materials such as aluminum, tin, boron, germanium, gallium, lead, silicon, titanium, chromium, zinc, yttrium, vanadium, zirconium, nickel, etc. (e.g., titanium dioxide, silica or silicon dioxide, etc.); suitable organic materials such as polyaniline, polyacetylene, polyphenylene, polypyrrole, other electrically conductive particles; and/or any suitable combination of materials (e.g., a blend of metal oxides, etc.). In certain embodiments, the filler material(s) may enhance corona resistance and/or one or more thermal properties (e.g., temperature resistance, cut-through resistance, heat shock, etc.). In certain embodiments, a filler material may include at least one of titanium dioxide, chromium dioxide, silica dioxide, or boron nitride. The particles of a filler material may have any suitable dimensions, and any suitable blending ratio or fill rate between filler material and polymeric materials may be utilized (e.g., a fill rate of approximately 5, 10, 15, 20, or 25 percent, or a fill rate included in a range between any of these values). Additionally, in the event that a filler includes a blend of different materials, any suitable blending ratio may be utilized between the components of the filler.

In certain embodiments, a tie layer or adhesion promoting layer may be formed between the first layer 115 and the second layer 120. A wide variety of suitable materials and/or combinations of materials may be utilized as desired to form a tie layer including, but not limited to, polyester, polyurethane, and/or polymeric materials that incorporate one or more adhesion promoters. As desired, the tie layer may be extruded or otherwise formed between the first layer 115 and the second layer 120. The use of a tie layer or adhesive promoting layer may permit a wide variety of different polymeric materials to be utilized for the first layer 115 and the second layer 120.

The first and second layers 115, 120 of extruded thermoplastic insulation may also be formed with a wide variety of suitable thicknesses and ratios of thicknesses. In certain embodiments, the first layer 115 may constitute at least fifty-five percent (55%) of a thickness of the extruded insulation (e.g., a combined thickness of the first and second layers 115, 120, etc.). In other embodiments, the first layer 115 may constitute between fifty-five percent (55%) and eighty percent (80%) of a thickness of the extruded insulation and the second layer 120 may constitute between twenty percent (20%) and forty-five percent (45%) of the thickness of the extruded insulation. In yet other embodiments, the first layer 115 may constitute between fifty-five percent (55%) and ninety percent (90%) of a thickness of the extruded insulation (or total insulation) and the second layer 120 may constitute between ten percent (10%) and forty-five percent (45%) of the thickness of the extruded insulation. Other thickness percentages and/or ratios of thicknesses may be utilized as desired in various embodiments. For example, the first layer 115 may constitute at least 51, 55, 60, 65, 70, 75, 80, 85, 90, or 95% of the total thickness of the extruded insulation, or a thickness included in a range between any two of the above values. The second layer 120 may constitute approximately 5, 10, 15, 20, 25, 30, 35, 40, 45, or 49% of the total thickness, a thickness included in a range bounded on a maximum end by one of the above values, or a thickness included in a range between two of the above values.

Additionally, in certain embodiments, a wide variety of suitable thickness ratios may be utilized between the first layer 115 and the second layer 120. In various example embodiments, a thickness ratio between the first layer 115 and the second layer 120 may be approximately 99/1, 95/5, 90/10, 85/15, 80/20, 75/25, 70/30, 60/40, 55/45, 51/49, or a ratio included in a range between any two of the above values.

The examples above describe magnet wires in which a first layer 115 of extruded polymer material is thicker than a second layer 120 of high-performance material. It was found that desired insulation performance can be achieved with a thicker first layer 115 while maximizing or enhancing the cost of a magnet wire. In other embodiments, a magnet wire may be formed with two extruded layers in which the first layer 115 is thinner than the second layer 115. For example, the first layer 115 may constitute approximately 5, 10, 15, 20, 25, 30, 35, 40, 45, or 49% of the total thickness of the first and second layers, a thickness included in a range between any two of the above values, or a thickness included in a range bounded on a maximum end by one of the above values. The second layer 120 may constitute approximately 51, 55, 60, 65, 70, 75, 80, 85, 90, or 95% of the total thickness of the extruded insulation, a thickness included in a range between any two of the above values, or a thickness included in a range bounded on a minimum end by one of the above values. Similarly, a wide variety of suitable thickness ratios may be utilized between the first layer 115 and the second layer 120. In various example embodiments, a thickness ratio between the first layer 115 and the second layer 120 may be approximately 1/99, 5/95, 10/90, 15/85, 20/80, 25/75, 30/70, 40/60, 45/55, 49/51, or a ratio included in a range between any two of the above values. In yet other embodiments, the first layer 115 and the second layer 120 may be formed with approximately equal thicknesses (e.g., an approximately 50/50 thickness ratio, etc.).

Although the respective first and second layers 115, 120 are illustrated in FIG. 1 as single layers, in other embodiments, one or both of the first and second layers 115, 120 may be formed from a plurality of sublayers. As a result, more than two individual layers of extruded thermoplastic insulation may be included in the insulation 110 of a wire 100. In certain embodiments, a plurality of lower cost or lower performance thermoplastic materials may be utilized to form sublayers of the first layer 115. In certain embodiments, a plurality of sublayers incorporated into an extruded layer, such as the first layer 115 or the second layer 120, may be formed from the same polymeric material (e.g., a single polymer material, a polymeric blend, etc.). In other embodiments, at least two sublayers may be formed from different polymeric materials. In one example embodiment, a first sublayer formed from a first material may provide greater adhesion to an underlying layer (e.g., the conductor 105, base insulation 125, an underlying first layer 115), and a second sublayer formed from a second material may provide other desirable properties (e.g., electrical performance, mechanical performance, fluid resistance, etc.). In another example embodiment, a first sublayer may be formed as a filled layer while a second sublayer (either formed from the same polymeric material or a different polymeric material) is unfilled. Indeed, a wide variety of sublayer configurations may be utilized as desired for either the first layer 115 or the second layer 120. As a result, it will be appreciated that any suitable number of layers of extruded insulation may be incorporated into a magnet wire 100.

Further, the overall extruded thermoplastic insulation (e.g., the combined first and second layers 115, 120, etc.) may be formed with a wide variety of suitable thicknesses. In certain embodiments, the extruded thermoplastic insulation may have a thickness between approximately 15 micrometers and approximately 200 micrometers. In other embodiments, the extruded thermoplastic insulation may have a thickness between 100 micrometers and 200 micrometers. In various embodiments, the overall extruded thermoplastic insulation may have a thickness of approximately 15, 20, 25, 50, 75, 100, 125, 150, 175, 200, 225, 250, 275, 300, 325, 350, 375, 400, 425, 450, 475, 500, 525, 550, 575, or 600 micrometers, a thickness included in a range between any two of the above values, or a thickness included in a range bounded on either a minimum or maximum end by one of the above values. Additionally, individual layers of the extruded thermoplastic insulation, such as the first and second layers 115, 120, may be formed with any suitable respective thicknesses.

These example thicknesses allow the extruded insulation to be thin enough to allow a relatively tight packing of the resulting magnet wire 100. Additionally, in certain embodiments, the extruded insulation may be formed to have a cross-sectional shape that is similar to that of the underlying conductor 105 and/or any base insulation 125. For example, if the conductor 105 has a rectangular cross-sectional shape, the extruded insulation may be formed to have a rectangular cross-sectional shape. In other embodiments, the extruded insulation may be formed with a cross-sectional shape that varies from that of the underlying conductor 105 (and/or the underlying base insulation 125). As one non-limiting example, the conductor 105 may be formed with an elliptical cross-sectional shape while the extruded insulation is formed with a rectangular cross-sectional shape. A wide variety of other suitable configurations will be appreciated.

An extrusion process may result in the formation of extruded insulation layers (e.g., the first and second layers 115, 120) from approximately 100% solid material. In other words, the extruded insulation layers may be free or substantially free of any solvents. As a result, the application of the extruded insulation layers may be less energy intensive than the application of an enamel layer as there is no need to evaporate solvents. In certain embodiments, the first and second layers 115, 120 may be formed simultaneously. In other words, a single polymeric extrusion step may be performed during which the first and second layers 115, 120 are co-extruded around the conductor 105. In other embodiments, the first and second layers 115, 120 may be formed via a plurality of separate or serial extrusion steps or operations. In other words, the first layer 115 may be extruded, and the second layer 120 may subsequently be extruded over the first layer 115. Any number of extrusion steps or operations may be performed as desired to construct the first and second layers 115, 120, as well as any sublayers thereof.

In certain embodiments, an extrusion process may be controlled such that the extruded first and second layers 115, 120 have relatively uniform thicknesses along a longitudinal length of the magnet wire 100. In other words, the extruded insulation and/or one or more extruded layers (e.g., the first layer 115, the second layer 120) may be formed with a concentricity that is approximately close to 1.0. The concentricity of the extruded insulation (or an extruded layer) is the ratio of the thickness of the extruded insulation to the thinness of the extruded insulation at any given cross-sectional point along a longitudinal length of the magnet wire 100. In certain embodiments the extruded insulation (or an extruded layer) may be formed with a concentricity between approximately 1.0 and 1.8. For example, the extruded insulation (or an extruded layer) may be formed with a concentricity of approximately 1.05, 1.1, 1.15, 1.2, 1.25, 1.3, 1.35, 1.4, 1.45, 1.5, 1.6, 1.7, 1.75, 1.8, a concentricity between any two of the above values, or a concentricity bounded on a maximum end by one of the above values (e.g., a concentricity of approximately 1.1 or less, a concentricity of approximately 1.3 or less, etc.). Similar to the extruded insulation layers, application of one or more other insulation layers (e.g., a layer of base insulation 125, etc.) may also be controlled to result in a desired concentricity, such as any of the example concentricities discussed above with reference to the extruded insulation.

As discussed above, in certain embodiments, the first layer 115 may be formed directly on the conductor 105 or the underlying base insulation 125. In other words, the first layer 115 may be formed on an underlying layer without the use of a bonding agent, adhesion promoter, or adhesive layer. For example, the first layer 115 may be formed from a polymeric material that provides a desired adhesion. As another example, the temperature of the magnet wire 100 may be controlled prior to the application of the first layer 115 to eliminate the need for an adhesive layer. As a result, the first layer 115 may be bonded to an underlying layer without use of a separate adhesive. In other embodiments, one or more suitable bonding agents, adhesion promoters, or adhesive layers may be incorporated between the first layer 115 and an underlying layer. A wide variety of suitable adhesion promoters may be utilized as desired. Similarly, in certain embodiments, the second layer 120 may be formed directly on the first layer 115. In other embodiments, one or more suitable bonding agents, adhesion promoters, or adhesive layers may be incorporated between the first layer 115 and the second layer 120. Similarly, bonding agents, adhesion promoters, and/or adhesive layers may optionally be incorporated between various sublayers of an extruded layer.

In other embodiments, one or more suitable surface modification treatments may be utilized on a conductor 105, any number of base insulation 125 layers, and/or any number of extruded layers to promote adhesion with a subsequently formed layer. For example, a surface of a conductor, enamel, base layer, or extruded layer may be modified by a suitable treatment in order to promote adhesion with a subsequently formed insulation layer (e.g., a subsequently formed enamel layer, a subsequently formed extruded layer, etc.). Examples of suitable surface modification treatments include, but are not limited to, a plasma treatment, an ultraviolet ("UV") treatment, a corona discharge treatment, and/or a gas flame treatment. A surface treatment may alter a topography of a conductor or insulation layer and/or form functional groups on the surface of the conductor or insulation layer that enhance or promote bonding of a subsequently formed insulation layer. As a result, surface treatments may reduce interlayer delamination.

As a result of forming extruded insulation with a plurality of layers (e.g., the first layer 115 and the second layer 120) that include different materials, the cost of a magnet wire 100 may be reduced relative to conventional magnet wires that utilize high-performance thermoplastic polymers, such as PEEK. For example, multi-layer insulation may include a first layer 115 formed from a less expensive material and a second layer 120 formed from a high-performance material, and the overall cost of the two layers 115, 120 may be lower than a single layer of the high-performance material (e.g., all PEEK, etc.). The multi-layer extruded insulation may also provide similar performance or, in some cases, better performance (e.g., PDIV, dielectric breakdown, temperature rating, etc.) relative to single layer insulation formed from a high-performance material (e.g., PEEK).

Extruded insulation formed with a plurality of layers including different materials and/or an insulation system that incorporates the extruded insulation may have a wide variety of suitable electrical performance parameters, such as a wide variety of suitable PDIV values and/or dielectric strength or breakdown strength values. In certain embodiments, multi-layer extruded insulation and/or an insulation system incorporating the multi-layer extruded insulation may provide a PDIV value at 25° C. of at least approximately 1000, 1100, 1200, 1250, 1300, 1350, 1400, 1450, 1500, 1550, 1600, 1700, 1800, 1900, 2000, 2100, 2200, 2300, or 2400 volts, or a PDIV value included in a range between any two of the above values. Similarly, in certain embodiments, extruded insulation and/or an insulation system incorporating the extruded insulation may provide a dielectric strength value (e.g., a dielectric strength value measured by a suitable industry standard test such as a shotbox or foil test, etc.) of at least approximately, 10,000, 11,000, 12,000, 12,500, 13,000, 13,500, 14,000, 14,500, 15,000, 15,500, 16,000, 16,500, 17000, 17,500, 18,000, 18.500, 19,000, 20,000, 20,500, or 21,000 volts, or a dielectric strength value included in a range between any two of the above values. In certain embodiments, the polymeric materials utilized to form the first layer 115 and the second layer 120 may be selected in order to achieve desired electrical (e.g., PDIV, dielectric strength, etc.) and/or chemical resistance properties for intended magnet wire applications.

The magnet wires 100, 200, 220, 250, 270 described above with reference to FIGS. 1-2D are provided by way of example only. A wide variety of alternatives could be made to the illustrated magnet wires 100, 200, 220, 250, 270 as desired in various embodiments. For example, a wide variety of different types of insulation layers may be incorporated into a magnet wire in addition to extruded insulation formed from a polymeric blend. As another example, the cross-sectional shape of a magnet wire and/or one or more insulation layers may be altered. Indeed, the present disclosure envisions a wide variety of suitable magnet wire constructions.

Figure 3:
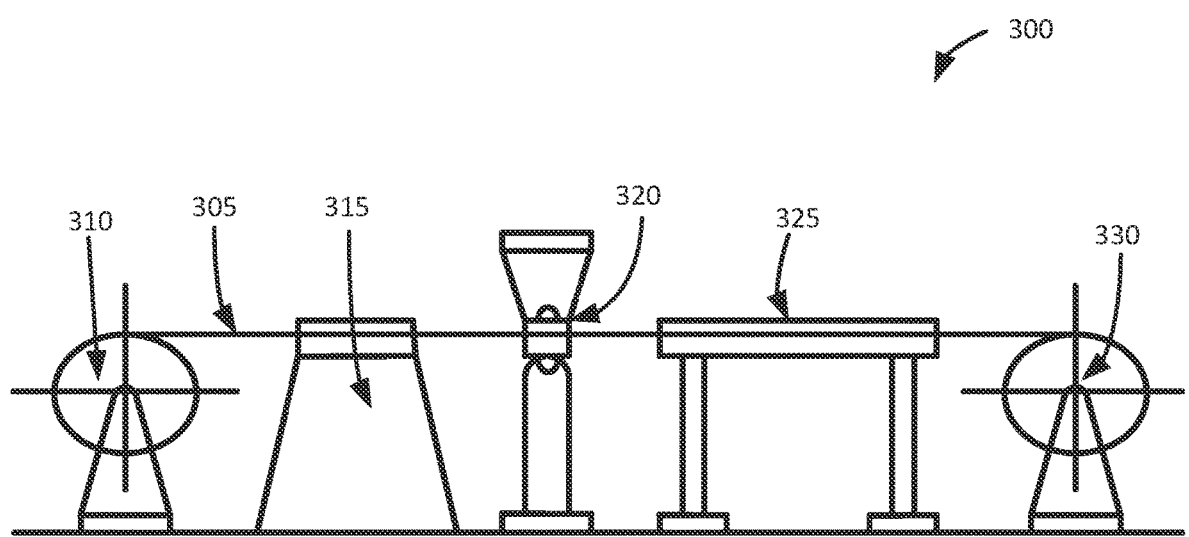
FIG. 3 is a schematic diagram of an example system that may be utilized to form extruded insulation on magnet wire, according to an illustrative embodiment of the disclosure.

A wide variety of suitable systems and/or methods may be utilized as desired to form multiple layers of extruded insulation on a magnet wire, such as any of the example magnet wires of FIGS. 1-2D. A schematic diagram of one example system 300 for forming multiple layers of extruded insulation is illustrated in FIG. 3. The system 300 may include a wide variety of components that facilitate processing a magnet wire 305. As shown, the system 300 may include a pay-off 310, a preheater 315, an extruder 320, a cooling trough 325, and a take-off 330. Each of these components, as well as other components that may optionally be incorporated into the system 300, are described in greater detail below.

With reference to FIG. 3, a suitable pay-off 310 may provide a magnet wire 305 to components of the system 300 configured to form extruded insulation. In certain embodiments, the pay-off 310 may provide magnet wire 305 having desired dimensions (e.g., a desired cross-sectional shape, a desired diameter, a desired width and thickness, etc.). As desired, base insulation may also be formed on the magnet wire 305 prior to the pay-off 310 providing the magnet wire 305. In other embodiments, the pay-off 310 may provide input material to one or more components configured to form a conductor having desired dimensions and/or to one or more components configured to form base insulation.

As desired, the system 300 may include one or more wire forming devices or components configured to receive input material (e.g., rod stock, etc.) and process the received input material to form a conductor with desired dimensions. For example, input material may be processed by a suitable rod breakdown device or rod mill that draws or pulls input material through one or more dies that reduce the size of the input material to desired dimensions. As desired, one or more flatteners and/or rollers may be used to modify the cross-sectional shape of the input material (e.g., to form rectangular wire). As another example, input material may be processed by a suitable conform device or system that forms a conductor having desired dimensions. As yet another example, a conductor may be formed via a 3D printing or additive manufacturing process.

In certain embodiments, the system 300 may include one or more components or subsystems configured to form base insulation on the magnet wire 305 prior to the formation of extruded insulation. For example, the system 300 may include one or more enamel formation components, such as a varnish application system (e.g., an application die, etc.) and one or more curing devices (e.g., an enameling oven, an ultraviolet curing system, etc.) configured to form any suitable number of enamel layers on the magnet wire 305. Other suitable base insulation formation components may be incorporated into the system 300 as desired.

With continued reference to FIG. 3, the system 300 may include one or more components configured to control the temperature of magnet wire 305 prior to the application of extruded insulation. For example, the magnet wire 305 may be passed through one or more preheaters 320 in order to attain a desired temperature prior to an extrusion process. A preheater 315 may include any suitable components configured to increase or raise the temperature of the magnet wire 305, such as one or more heating coils, heaters, ovens, etc. As necessary, one or more cooling devices may also be utilized. The temperature of the magnet wire 305 may be adjusted or controlled to achieve a wide variety of suitable values prior to extrusion. For example, in certain embodiments, the temperature may be controlled to approximately, 180° C. or greater, 200° C. or greater, or another desired temperature prior to extrusion. As another example, temperature may be controlled to approximately 400° F. or greater prior to extrusion. Controlling or maintaining the temperature at this level may facilitate adhesion between the extruded thermoplastic layer and the underling conductor or base insulation.

One or more suitable extruders 320 or extrusion devices may be configured to receive the magnet wire 305 and extrude multiple layers of thermoplastic insulation on the magnet wire 305. In certain embodiments, the extruder(s) 320 may be configured to co-extrude both a first layer and a second layer of extruded thermoplastic insulation. In other embodiments, the extruder(s) 320 may be configured to serially or successively apply the first layer and the second layer of extruded thermoplastic insulation. In certain embodiments, each extruder 320 may be a single screw or a multi-screw (e.g., dual screw, etc.) extruder configured to receive input material and process (e.g., mix, increase the temperature, increase the pressure, etc.) the input material prior to extrusion onto the magnet wire 305 by any number of suitable extrusion heads and/or other devices configured to apply a desired amount of thermoplastic insulation. As desired, the flow rates of the extruded insulation may be controlled in order to obtain a desired thickness. Additionally, in certain embodiments, one or more extrusion dies may be utilized to control the thickness and/or shape of the extruded insulation.

A wide variety of suitable operations may be performed in order to facilitate and/or optimize the co-extrusion of a plurality of layers of thermoplastic insulation, such as first and second layers of extruded insulation. In certain embodiments, the melt temperatures and/or viscosities of one or more extruded materials may be adjusted in order to optimize the compatability and/or adhesion of the extruded materials. In certain embodiments, the conductor temperature may also be adjusted in order to optimize compatability and/or adhesion of one or more extruded materials.

With continued reference to FIG. 3, the system 300 may include any suitable devices configured to control the temperature of the magnet wire 305 following the extrusion process. In certain embodiments, the extruded insulation may be heated following extrusion. Additionally, in certain embodiments, the process of cooling the extruded insulation prior to taking up the finished magnet wire 305 may be controlled. As a result of controlling the cooling rate of the extruded insulation, desirable characteristics (e.g., a desired crystallinity, etc.) may be achieved. Cooling devices may include any suitable devices and/or systems configured to lower the temperature of the finished magnet wire prior to take-up (or subsequent processing). In certain embodiments, the cooling devices may include a cooling trough 325, quencher, or liquid bath (e.g., a water bath) through which the magnet wire 305 may be passed in order to cool. The temperature of the liquid in the bath may be controlled via recycling liquid. Additionally, the cooling rate may be controlled as a function of controlling the liquid temperature and/or establishing a desired length of the cooling trough 325.

Following cooling of the extruded insulation, the finished magnet wire 305 may be provided to one or more suitable take-offs 330, accumulators, or take-up devices. These devices may, for example, apply tension to the magnet wire 305, bundle the wire 305, and/or wind the finished wire 305 onto a spool. In other embodiments, the magnet wire 305 may be provided to one or more downstream devices or components prior to take-off. For example, the magnet wire 305 may be provided to one or more components configured to form additional insulation on the magnet wire 305, such as a subsystem configured to form a conformal insulation layer (e.g., a parylene layer, etc.) on the magnet wire 305. As another example, the magnet wire 305 may be provided to one or more components configured to form one or more articles from the magnet wire 305, such as hairpins or coils that may be incorporated into a motor or other electrical appliance.

In certain embodiments, formation of the first and second layers of extruded insulation may be formed in a tandem or inline manner with one or more other processes. For example, formation of the extruded insulation may be formed in a tandem manner with wire drawing or conductor formation and/or with the formation of one or more base insulation layers. In other embodiments, the magnet wire 105 may be taken up at any suitable steps within the overall process and subsequently provided to another component or subsystem.

Additionally, any suitable number of motors, flyers, capstans, and/or load cells may be incorporated into the system 300 to control passage of magnet wire 305 through the system 300. Any suitable number of controllers (e.g., control units, computers, microcontrollers, etc.) may be configured to control various components of the system 300. For example, one or more controllers may facilitate synchronization of motors and/or line speeds within the system 300. As desired, a controller and/or combination of controllers may additionally control a wide variety of other parameters, such as the flow rate of an applied varnish, the temperature of an enameling oven, the temperature of various heating/cooling devices, the flow rate of an extrusion device, the temperature of liquid included in a quencher, and/or various testing conducted on the magnet wire 305. Each controller may be a separate component or, alternatively, incorporated into another device or component. Additionally, any number of suitable communications channels (e.g., wired communications channels, wireless communications channels, etc.) may facilitate communication between a controller and one or more other components (e.g., one or more motors, another controller, other devices, etc.).

The system 300 described above with reference to FIG. 3 is provided by way of example only. A wide variety of other suitable systems may be utilized to form a magnet wire that includes multiple layers of extruded insulation. These systems may include more or less components than the system 300 of FIG. 3. Additionally, these systems may include certain alternative components to the system 300 of FIG. 3, which is provided by way of non-limiting example only. Indeed, the present disclosure envisions a wide variety of suitable systems that may be utilized to form magnet wire.

Figure 4:
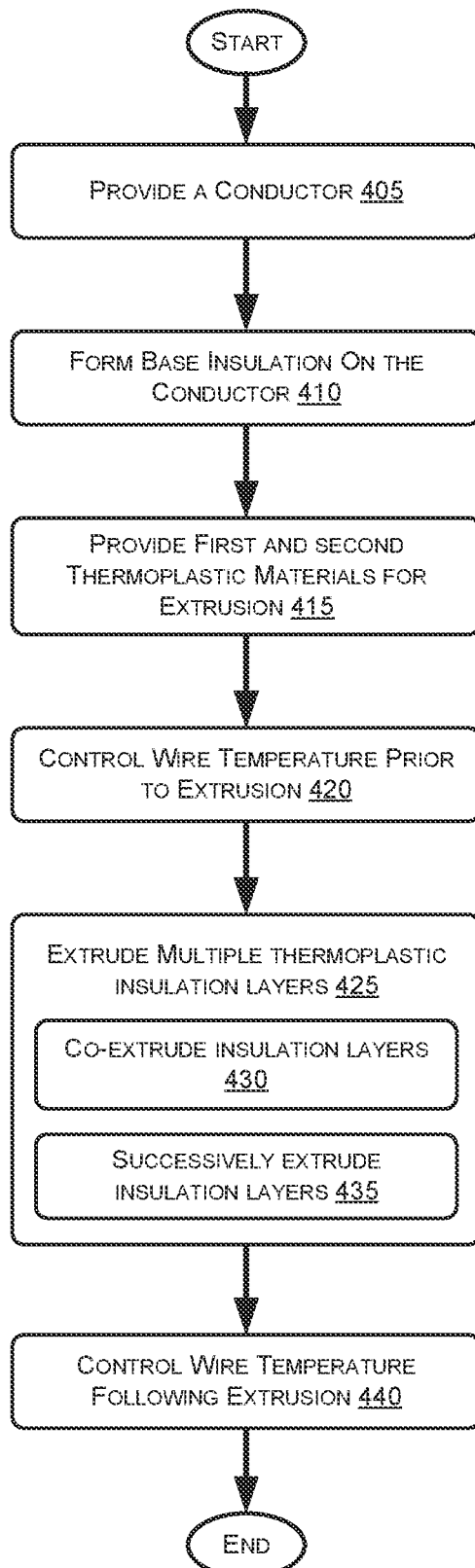
FIG. 4 is a flowchart depicting an example method for forming magnet wire that includes extruded insulation formed from multiple layers of different materials, according to an illustrative embodiment of the disclosure.

FIG. 4 is a flowchart depicting an example method 400 for forming magnet wire that includes multiple layers of extruded insulation, according to an illustrative embodiment of the disclosure. The method 400 may be performed utilizing a wide variety of suitable systems and/or devices. For example, a portion of the method 400 may be performed by the system 300 of FIG. 3. The method 400 may begin at block 405, and a conductor may be provided. In certain embodiments, a preformed conductor having desired dimensions may be provided. In other embodiments, input material may be provided and processed in order to form a conductor having desired dimensions. For example, input material may be processed by a rod mill, flatteners, and/or rollers in order to provide a conductor having desired dimensions.

At block 410, which is optional in certain embodiments, base insulation may be formed on the conductor. A wide variety of suitable base insulation and/or combinations of different types of base insulation may be formed as desired. For example, one or more enamel layers may be formed. In certain embodiments, one or more layers of polyamideimide and/or polyimide enamel may be formed as base insulation. As another example, one or more semi-conductive layers may be formed.

At block 415, first and second thermoplastic polymeric materials may be provided for extrusion. As set forth herein, a wide variety of suitable materials, combinations of materials, and/or polymeric blends may be provided as first and second polymeric materials. According to an aspect of the disclosure, the first polymeric material may be different from the second polymeric material, and the materials may have different properties, such as different thermal indexes, thermal classes, melt points, glass transition temperatures, etc. In certain embodiments, a first thermoplastic polymeric material may include at least one of polyester, nylon, polyphenylene sulfide ("PPSU"), or polyphenylsulfone ("PPS"). A second thermoplastic polymeric material may include at least one of polyetheretherketone ("PEEK"), polyaryletherketone ("PAEK"), or polyetherketoneketone ("PEKK"). Other suitable materials may be provided as desired. Additionally, a wide variety of fillers, compatabilizers, and/or other suitable additives may be incorporated into a polymeric material as desired in various embodiments.

At block 420, the temperature of the conductor or wire, whether or not it includes base insulation, may be controlled prior to extrusion. For example, one or more suitable preheaters or other devices may be utilized to control a pre-extrusion temperature. Multiple layers of thermoplastic insulation may then be formed at block 425. For example, the first polymeric material may be utilized to extrude a first layer, and the second polymeric material may be utilized to form a second layer. A wide variety of suitable techniques may be utilized to extrude the first and second layers of polymeric insulation as desired in various embodiments. For example, at block 430, multiple layers of polymeric insulation may be co-extruded onto the wire. In other words, first and second layers may be co-extruded. As another example, at block 435, multiple layers of polymeric insulation may be successively extruded onto the wire. In other words, a first layer may be extruded, and a second layer may be subsequently extruded over the first layer. Any suitable extrusion device and/or combination of extrusion devices may be utilized to extrude the multiple layers of thermoplastic insulation. The temperature of the magnet wire and extruded insulation may then be controlled at block 440 following extrusion. For example, a cooling trough and/or other suitable components may be utilized to cool the magnet wire following extrusion.

In certain embodiments, the method 400 may end following block 440. In other embodiments, one or more additional operations may be performed. For example, in certain embodiments, one or more additional insulation layers (e.g., another extruded layer, a conformal layer, etc.) may be formed on the magnet wire. As another example, the magnet wire may be formed into one or more articles (e.g., coils, hairpins, etc.) that may be incorporated into an electrical appliance. The method 400 may then end following the additional operations.

The operations described and shown in the method 400 of FIG. 4 may be carried out or performed in any suitable order as desired in various embodiments. Additionally, in certain embodiments, at least a portion of the operations may be carried out in parallel. Furthermore, in certain embodiments, less than or more than the operations described in FIG. 4 may be performed.

EXAMPLES

As set forth above, a wide variety of suitable polymeric materials may be utilized to form co-extruded magnet wire insulation. For example, a wide variety of suitable polymeric materials may be utilized to form the first layer 115 and the second layer 120 of the magnet wire 100 of FIG. 1. The examples set forth in Tables 1 and 2 below are intended as illustrative and non-limiting, and represent specific embodiments of the present disclosure in which certain example polymeric materials are utilized to form co-extruded magnet wire insulation. The wire samples discussed in the examples of Table 1 were all prepared as rectangular wire having a conductor width of approximately 3.384 mm and a conductor thickness of approximately 1.834 mm with a tolerance of +/−0.015 mm. The conductors were formed from oxygen free copper. Additionally, base insulation was formed from polyamideimide ("PAI"). The wire samples discussed in the examples of Table 2 were all prepared as rectangular wire having a conductor width of approximately 0.386 inches (approximately 9.80 mm) and a conductor thickness of approximately 0.150 inches (approximately 3.81 mm). The conductors were formed from aluminum, and no base insulation was formed on the conductors prior to extrusion. In other embodiments, conductors may be formed from any suitable materials having any suitable dimensions. Additionally, any suitable base insulation may be utilized as desired or alternatively, no base insulation may be included.

With reference to Table 1, a few example co-extruded wire samples are provided. In particular, a first co-extruded sample includes a first extruded layer of PEI and a second extruded layer of PEEK formed over the PEI. A second co-extruded sample includes a first extruded layer of PPSU and a second extruded layer of PAEK formed over the PPSU. Additionally, control samples of extruded single material PEEK, PPSU (e.g., Radel 5800), and PEI (e.g. Ultem 1000) are provided for comparison to the co-extruded samples. A total thickness of the extruded insulation system is provided for each sample. For each co-extruded sample, approximately equal thicknesses of the two materials (i.e., the first and second layers) were formed. Additionally, measured performance criteria for the extruded samples are provided. First, measured PDIV values at room temperature are provided. Dielectric breakdown values determined utilizing a shotbox test are also provided. In a shotbox test, a magnet wire is submerged in shot balls and tested until failure.

TABLE 1

Comparative Samples of Co-extruded Magnet Wire

| Formulation | PPSU | PEI | PEEK | Co-extruded PEI/PEEK | Co-extruded PPSU/PAEK |
|---|---|---|---|---|---|
| Thickness (μm) | 354 | 324 | 182 | 280 | 250 |
| PDIV Vp (room temperature) | 1764 | 1513 | 1201 | 2758 | 2248 |
| DB Shotbox Volts | 12636 | 16046 | 11734 | 11480 | 13940 |

As shown in Table 1, certain co-extruded insulation systems may provide similar or better performance than conventional single polymer extruded materials (e.g., PEEK, PPSU, PEI, etc.). For example, certain co-extruded insulation systems may provide enhanced PDIV and/or dielectric breakdown performance. As shown, the co-extruded PEI/PEEK and PPSU/PAEK samples exhibited much higher PDIV values than single polymer extruded samples. Indeed, the co-extruded samples exhibited improved PDIV relative to single polymer samples (e.g., PPSU, PEI, etc.) that were much thicker than the co-extruded samples. Further, the dielectric breakdown voltage of the co-extruded samples were similar to or better than single polymer extruded samples. It is noted that the single polymer samples illustrating higher dielectric breakdown values have thicker insulation than the co-extruded samples, which leads to higher dielectric breakdown voltage. Comparative single polymer samples with similar insulation thicknesses would have lower dielectric breakdown voltages. Further, the co-extruded samples were found to have higher or improved chemical resistance relative to the single polymer samples utilizing PEI and PPSU. Additionally, the use of certain co-extruded insulation systems may reduce overall insulation costs relative to conventional single polymer materials.

With reference to Table 2, a few example co-extruded wire samples that include different thickness ratios of first and second extruded layers are provided. In particular, a first co-extruded sample includes a first extruded layer of PPSU and a second extruded layer of PEEK formed over the PPSU. The ratio of the PPSU/PEEK thicknesses is approximately 75/25. A second co-extruded sample also includes a first extruded layer of PPSU and a second extruded layer of PEEK formed over the PPSU. The ratio of the PPSU/PEEK thicknesses is approximately 55/45. Additionally, three different control samples of extruded single material PEEK are provided for comparison to the co-extruded samples. A total thickness of the extruded insulation system is provided for each sample. Additionally, measured performance criteria for the extruded samples are provided. First, measured PDIV values at room temperature are provided. Dielectric breakdown values determined utilizing a shotbox test are also provided.

TABLE 2

Comparative Samples of Co-extruded Magnet Wire

| Formulation | PEEK #1 | PEEK #2 | PEEK #3 | Co-extruded PPSU/PEEK | Co-extruded PPSU/PEEK |
|---|---|---|---|---|---|
| Thickness Ratio | N/A | N/A | N/A | 75/25 | 55/45 |
| Thickness (μm) | 155 | 120 | 160 | 112 | 166 |

TABLE 2-continued

Comparative Samples of Co-extruded Magnet Wire

| Formulation | PEEK #1 | PEEK #2 | PEEK #3 | Co-extruded PPSU/PEEK | Co-extruded PPSU/PEEK |
|---|---|---|---|---|---|
| PDIV Vp (room temperature) | 1820 | 1679 | 1905 | 1602 | 1758 |
| DB Shotbox Volts | 13530 | 9478 | 12093 | 4733 | 9250 |

As shown in Table 2, the co-extruded insulation systems that include PEEK over another extruded material provide similar performance to conventional insulation that only includes PEEK. It is noted that the first co-extruded sample was formed with a smaller thickness than several of the control samples of PEEK. Given a higher thickness, the PDIV of the second sample would be increased and would likely be comparable to the thicker PEEK samples. Additionally, the dielectric shotbox test measures the dielectric strength at the thinnest area of insulation. Given the novelty of the co-extrusion process utilized to form the co-extruded samples, some relatively thin areas of insulation were included in the samples, thereby leading to lower dielectric strength measurements. As the co-extrusion process is improved and optimized, wire can be formed with better concentricity, thereby improving the dielectric strength of the co-extruded insulation. Additionally, even given the unoptimized manufacturing process, it is noted that the 55/45 co-extruded sample had a dielectric strength comparable to the PEEK samples. Therefore, it was observed and can be concluded that magnet wire formed with PEEK over a lower cost and lower performance material (e.g., PPSU, etc.) may have a similar PDIV and dielectric breakdown performance as conventional magnet wire that only includes PEEK. Provided that a threshold thickness ratio of high-performance material (e.g., PEEK) is provided, desired overall insulation performance may be achieved with a co-extruded magnet wire. However, the overall cost of the insulation system and the magnet wire may be reduced relative to conventional magnet wire that only includes extruded PEEK insulation.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming insulated magnet wire, the method comprising:
   providing a conductor; and
   forming extruded insulation around the conductor, wherein forming extruded insulation comprises:
   co-extruding both a first layer of thermoplastic insulation and a second layer of thermoplastic insulation around the conductor, the second layer formed around the first layer and in contact with an entire outer periphery of the first layer,
   wherein the first layer comprises a first polymeric material having a first thermal index, and comprising at least one of polyester, nylon, polyphenylene sulfide, or polyphenylsulfone, the first layer comprising at least fifty-five percent of a thickness of the extruded insultation; and the second layer comprises a second polymeric material having a second thermal index higher than the first thermal index and comprising at least one of polyetheretherketone, polyaryletherketone, or polyetherketoneketone, and
   wherein the extruded insulation has a partial discharge inception voltage of at least 1200 volts.

2. The method of claim 1, wherein co-extruding a first layer of thermoplastic insulation and a second layer of thermoplastic insulation comprises:
   extruding a first layer comprising between fifty-five percent and eighty percent of a total thickness of the extruded insulation, and
   extruding a second layer comprising between twenty percent and forty-five percent of the thickness of the insulation.

3. The method of claim 1, wherein co-extruding a first layer of thermoplastic insulation and a second layer of thermoplastic insulation comprises extruding a solid first layer and a solid second layer.

4. The method of claim 1, wherein co-extruding a first layer of thermoplastic insulation and a second layer of thermoplastic insulation comprises extruding a first layer directly on the conductor.

5. The method of claim 1, wherein forming extruded insulation around the conductor comprises forming extruded insulation having a thickness between 15 micrometers and 200 micrometers.

6. The method of claim 1, wherein forming extruded insulation around the conductor comprises forming extruded insulation having a thickness between 100 micrometers and 200 micrometers.

7. The method of claim 1, wherein co-extruding a first layer of thermoplastic insulation and a second layer of thermoplastic insulation comprises:
   extruding a first layer from a first polymeric material having a thermal index of 200° C. or less, and
   extruding a second layer from a second polymeric material having a thermal index of 240° C. or more.

8. The method of claim 1, wherein co-extruding a first layer of thermoplastic insulation and a second layer of thermoplastic insulation comprises:
   extruding a first layer from a first polymeric material comprising an amorphous material, and
   extruding a second layer from a second polymeric material comprising a semi-crystalline or a crystalline material.

9. The method of claim 1, further comprising:
   incorporating a filler material into one of the first polymeric material or the second polymeric material.

10. The method of claim 9, wherein incorporating a filler material comprises incorporating at least one of titanium dioxide, chromium dioxide, silica dioxide, carbon nanotubes, or boron nitride.

11. The method of claim 1, further comprising:
forming base insulation around the conductor, the base insulation comprising at least one layer of polymeric enamel,
wherein forming extruded insulation comprises forming extruded insulation around the base insulation.

12. A method for forming insulated magnet wire, the method comprising:
providing a conductor; and
co-extruding both a first layer of thermoplastic insulation and a second layer of thermoplastic insulation around the conductor, the second layer formed around the first layer and in contact with an entire outer periphery of the first layer,
wherein the first layer comprises a first polymeric material having a first thermal index and comprising at least one of polyester, nylon, polyphenylene sulfide, or polyphenylsulfone; and the second layer comprises a second polymeric material having a second thermal index higher than the first thermal index and comprising polyetherketoneketone,
wherein a thickness of the extruded insulation is between 15 micrometers and 200 micrometers, and
wherein the first layer comprises at least fifty-five percent of a total thickness of the first and second layers.

13. The method of claim 12, wherein co-extruding both a first layer of thermoplastic insulation and a second layer of thermoplastic insulation comprises extruding a solid first layer and a solid second layer.

14. The method of claim 12, wherein co-extruding both a first layer of thermoplastic insulation and a second layer of thermoplastic insulation comprises extruding a first layer directly on the conductor.

15. The method of claim 12, wherein co-extruding both a first layer of thermoplastic insulation and a second layer of thermoplastic insulation comprises:
extruding a first layer from a first polymeric material having a thermal index of 200° C. or less, and
extruding a second layer from a second polymeric material having a thermal index of 240° C. or more.

16. The method of claim 12, further comprising:
incorporating a filler material into one of the first polymeric material or the second polymeric material, the filler material comprising at least one of titanium dioxide, chromium dioxide, silica dioxide, carbon nanotubes, or boron nitride.

17. A method for forming insulated magnet wire, the method comprising:
providing a conductor; and
co-extruding both a first layer of thermoplastic insulation and a second layer of thermoplastic insulation around the conductor,
the first layer formed around the conductor from a first thermoplastic polymeric material having a first thermal index, the first thermoplastic polymeric material comprising at least one of polyester, nylon, polyphenylene sulfide, or polyphenylsulfone,
the second layer formed around the first layer and in contact with an entire outer periphery of the first layer, the second layer formed from a second thermoplastic polymeric material having a second thermal index higher than the first thermal index, the second thermoplastic polymeric material comprising at least one of polyetheretherketone, polyaryletherketone, or polyetherketoneketone,
wherein a thickness of the co-extruded insulation is between 250 micrometers and 600 micrometers, and
wherein the first layer comprises at least fifty-five percent of a total thickness of the first and second layers.

\* \* \* \* \*